United States Patent
Bourquin et al.

(10) Patent No.: US 8,427,076 B2
(45) Date of Patent: Apr. 23, 2013

(54) INTELLIGENT AREA LIGHTING SYSTEM

(75) Inventors: Sean Bourquin, Victoria (CA); Damien Hortsing, Victoria (CA); Brock Johnston, Brentwood Bay (CA)

(73) Assignee: Carmanah Technologies Corp., Victoria, British Columbia (CA)

( * ) Notice: Subject to any disclaimer, the term of this patent is extended or adjusted under 35 U.S.C. 154(b) by 420 days.

(21) Appl. No.: 12/665,925

(22) PCT Filed: Jun. 30, 2008

(86) PCT No.: PCT/CA2008/001212
§ 371 (c)(1),
(2), (4) Date: Dec. 21, 2009

(87) PCT Pub. No.: WO2009/003279
PCT Pub. Date: Jan. 8, 2009

(65) Prior Publication Data
US 2010/0201267 A1  Aug. 12, 2010

Related U.S. Application Data

(60) Provisional application No. 60/947,331, filed on Jun. 29, 2007.

(51) Int. Cl.
*H05B 37/02* (2006.01)

(52) U.S. Cl.
USPC .......................... 315/307; 315/149; 315/312

(58) Field of Classification Search .................. 315/149, 315/158, 291, 307, 312; 340/539.26, 540, 340/541, 545.3, 555, 573.2
See application file for complete search history.

(56) References Cited

U.S. PATENT DOCUMENTS

| | | | |
|---|---|---|---|
| 3,893,000 A | 7/1975 | Guercio | |
| 5,552,767 A | 9/1996 | Toman | |
| 5,726,629 A * | 3/1998 | Yu | 340/565 |
| 5,939,987 A * | 8/1999 | Cram | 340/573.2 |
| 6,388,399 B1 | 5/2002 | Eckel et al. | |
| 6,548,967 B1 | 4/2003 | Dowling et al. | |
| 6,608,453 B2 | 8/2003 | Morgan et al. | |
| 7,030,777 B1 * | 4/2006 | Nelson et al. | 340/933 |
| 7,053,784 B2 * | 5/2006 | Hatfield et al. | 340/686.1 |
| 7,202,613 B2 | 4/2007 | Morgan et al. | |
| 7,309,965 B2 | 12/2007 | Dowling et al. | |
| 7,550,931 B2 | 6/2009 | Lys et al. | |
| 2002/0109610 A1 * | 8/2002 | Katz | 340/932.2 |

(Continued)

FOREIGN PATENT DOCUMENTS

| | | |
|---|---|---|
| BE | 1009084 | 11/1996 |
| CA | 2589238 | 6/2006 |

(Continued)

*Primary Examiner* — Tung X Le
(74) *Attorney, Agent, or Firm* — Quarles & Brady LLP; Gavin J. Milczarek-Desai

(57) ABSTRACT

An area lighting system is composed of a plurality of lighting elements that are responsive to the movement and progression of a user through the area. Each lighting element comprises at least one light, means for powering the lighting element, a processor, communication means and is associated with a motion sensor. Detection of a user is communicated to other lighting elements that provide an appropriate level of illumination depending on the distance from the user. The lighting elements are substantially self-configurable and may be set for either a radial proximity lighting protocol or a path network lighting protocol.

37 Claims, 7 Drawing Sheets

U.S. PATENT DOCUMENTS

| | | | |
|---|---|---|---|
| 2002/0153851 A1* | 10/2002 | Morgan et al. ............... | 315/291 |
| 2004/0105264 A1 | 6/2004 | Spero | |
| 2005/0242267 A1 | 11/2005 | Lovato et al. | |
| 2007/0222399 A1* | 9/2007 | Bondy et al. ................ | 315/291 |
| 2008/0198039 A1* | 8/2008 | Philiben ...................... | 340/961 |
| 2008/0273333 A1* | 11/2008 | Berns et al. ................. | 362/294 |
| 2009/0040750 A1 | 2/2009 | Myer | |
| 2010/0001652 A1 | 1/2010 | Damsleth | |
| 2010/0029268 A1* | 2/2010 | Myer et al. ................. | 455/426.1 |

FOREIGN PATENT DOCUMENTS

| | | |
|---|---|---|
| DE | 102007007031 | 8/2007 |
| DE | 202007002125 | 8/2007 |
| EP | 1251721 | 10/2002 |
| EP | 1408276 | 4/2004 |
| EP | 1465463 | 10/2004 |
| FR | 2 884 654 | 10/2006 |
| GB | 2303906 | 3/1997 |
| GB | 2372160 | 8/2002 |
| GB | 2444734 | 6/2008 |
| JP | 7263151 | 10/1995 |
| KR | 20040053049 | 6/2004 |
| WO | WO 03/098977 | 11/2003 |
| WO | WO2005/041146 | 5/2005 |
| WO | WO 2008/033029 | 3/2008 |
| WO | WO2008/033029 A1 | 3/2008 |
| WO | WO2008/059412 | 5/2008 |

* cited by examiner

FIG. 2

INTELLIGENT AREA LIGHTING SYSTEM

FIELD OF THE INVENTION

The invention relates to a method and apparatus for intelligent area lighting. More specifically, it relates to a plurality of lighting systems that are configurable to sequentially and gradually illuminate an area as a user moves through it.

BACKGROUND OF THE INVENTION

As people look to conserve energy by reducing power consumption, solar energy becomes a viable option to provide power for lighting systems in public areas. However, in some parts of the world, particularly at certain times of the year, the amount of sunlight available to charge a solar-powered system may simply not provide sufficient energy to power a lighting system for an extended period of time at night or in low light conditions. While more energy may be obtained by using larger solar panels, such solution is restricted by space and cost considerations. It is therefore desirable to use a lighting system that conserves as much energy as possible, by selectively activating only when light is required for a user.

The present invention provides selective illumination in the immediate vicinity of a user moving through an open area or along a path by detecting the presence of the user and anticipating the user's progress through the area.

Motion-sensitive lighting is often used in infrequently accessed areas, where continuous lighting may be unnecessary and expensive. For example, it is well known to provide motion sensor-activated lighting in connection with security systems. Such motion-sensitive lighting is often intended as a deterrent and is therefore often very bright and harsh, tending to suddenly flood a particular area with light.

Motion-sensitive lighting may also be intended to assist a user, for example by illuminating an area so that a user may quickly view an area of interest. Such illumination again tends to be relatively sudden and harsh, which can actually hinder a user's efforts, for example, as he seeks a keyhole to unlock a door.

In the context of a person travelling through an open area or along a path, immediate and harsh lighting may be undesirable and may detract from the enjoyment of the stroll and from the mood of the visitor. When used in an area adjacent other occupants or residents, sudden intermittent lighting may also be is viewed as light pollution.

The use of typical prior art motion sensor technology in an open area or along a path would also entail the user who wishes to proceed in a given direction having to commit to an area that is initially unlighted until a motion sensor detects the user and activates a light—a potentially unnerving experience for some.

Prior art motion sensors most often activate their associated lights for a predetermined period of time after motion has been detected, following which the light turns off. This predetermined persistency fails to take into account the speed and progress of a user along a path, resulting in wasted energy and imprecise tracking of the user.

In an attempt to maximize the responsiveness of lighting systems, it is known to assign to each light in a lighting system a unique identifier enabling each light to be separately instructed and controlled. U.S. Pat. No. 6,292,901 describes such a system in which DIP switches are manually set on each light in a lighting network. This means of configuring a lighting network is obviously labour-intensive, time consuming and prone to human error.

U.S. Patent Publication No. 2007/0057807 discloses a network of luminaire managers. Once the network is configured, each luminaire manager transmits information on the status of a luminaire under its control to a central network server. Each manager also communicates with the neighboring managers upon installation, to ensure that it is operational. Configuration is accomplished by collecting the identification number for each luminaire, its GPS grid coordinates, the type of equipment (such as sensors and lights) installed, and the initial equipment parameters, using a portable field unit operated by the installer. The information must then be downloaded to the central operations system.

U.S. Pat. No. 6,859,644 discloses a networked lighting system wherein each new lighting device requests an identification code from a master control. The master control transmits an identification code to the lighting device, and then requests verification that the code has been received. Once the code has been received and stored, the lighting device provides a visual indication to a user, such as by illuminating. In order to complete the sequence, the user must press a button on a remote control, confirming receipt of the visual indication.

U.S. Patent Publication No. 2004/0160199 describes attaching a programming device to a lighting device, then selecting a mode, such as programming mode or addressing mode. The programming device may transmit the lighting device's pre-programmed identification code to the central controller, or the central controller may transmit an address to the programming device, which deposits the code into the lighting device's memory. The same programming device is apparently attached to each lighting device in turn. Alternatively, the central controller may query a controller on a lighting device, and assign an identification code once it receives a response from the controller.

U.S. Patent Publication No. 2004/0254725 discloses a plurality of lighting devices, each of which may have its own integrated communication and control module. A central controller polls each module, using incremental serial numbers. Once a module receives its own serial number, it responds with its location coordinates. The central controller may then display a map of all lighting device locations. In larger networks, branches of lighting devices can each have their own local controller, and the branches are then networked through a central controller. However, it is desirable to eliminate excess levels of control in a given system, in order to reduce the complexity of the system, as well as the overall cost of implementing it. Further, autonomous operation of the lighting devices in a system is preferred in order to maximize the system responsiveness.

It is an object of the invention to provide an intelligent, user-responsive lighting system to illuminate an area or a path.

It is a further object of the invention to provide lighting for a user of an area that will gradually and progressively illuminate the user's path, and that may gradually and softly extinguish the lights after the user has passed so as to provide a less stressful and more pleasant illumination effect.

It is a further object of the invention to provide pathway lighting that directs the user along the path by anticipating the user's progress and direction.

It is yet a further object of the invention to provide a lighting system that is easily configurable with a minimum of effort on the part of the installer.

It is yet a further object of the invention to provide an intelligent lighting system in which the individual lighting elements and their associated control mechanisms may be quickly and simply installed.

These and other objects of the invention will be appreciated by reference to the summary of the invention and to the detailed description of the preferred embodiment that follow, it being understood that not all objects are necessarily simultaneously attained by each aspect of the invention, and that not all objects are necessarily fulfilled by each claim of the application.

SUMMARY OF THE INVENTION

The present invention provides an area lighting system with essentially distributed intelligence, obviating the need for a central server or controller, and allowing for self-configurability of the overall lighting network. Each of a plurality of lighting elements includes a light, means for providing power to the lighting element and a processor. Each lighting element is associated with a motion sensor for detecting the presence of a user to be illuminated and includes a transmitter and a receiver for communicating the presence of a user to other similar lighting elements located in proximity to the lighting element and toward which the user might be moving. Depending on their relative proximity to the transmitting lighting element or to the motion sensor, the receiving lighting elements light up gradually to create a smooth transition from dark to light that follows and anticipates the movement of the user. As a result, the lights illuminate a certain distance ahead of and behind the user, and the sequential and gradual illumination "moves" the light gradient through the area with the user.

The lighting system of the invention may be applied to open areas, such as parking lots or fields, or to areas comprising one or more paths, such as gardens or public parks. Municipalities, universities and other locations having path systems and/or open areas that are also concerned with the environment and power conservation will also employ the system described.

In one aspect of the invention, the plurality of lighting elements operate on a simple radial proximity lighting protocol. In another aspect, the plurality of lighting elements may be configured to define a particular path that is determined as part of the configuration process. Preferably, the lighting elements may be selectively configured for either radial or path-wise operation.

In another aspect, the lighting elements may be pre-configured or may be configured in the field to adjust the desired rate of illumination, the maximum intensity, the time of illumination after a user has left the area of the motion sensor, the light intensity gradient over successive lights in the vicinity of the user, the speed sensitivity of the activation zone and the ambient light levels needed to justify responding to the sensing of a user. Other parameters may also be modified as will be discussed below.

In another aspect, the lighting elements and the lighting protocol may be configured to automatically adjust the illuminated distances ahead of and behind the user according to the speed of the user.

According to the invention as applied to a path context, the lighting elements may be batch configured to define a particular path or path segment, enabling a network of paths to be illuminated and to gradually track and anticipate a user's progress along various segments of the path network.

Another aspect of the invention is the auto-configurability of the plurality of lighting elements in a path context. Each lighting element comprises means of locating its absolute geographical position independently of the other lighting elements. A plurality of such lighting elements is deployed along a linear path or a linear path segment. Upon triggering the auto-configuration feature, the lighting elements will communicate their respective geographic locations with one another. Such communication is done either by broadcasting across the entire range of the path or path segment for simultaneous reception by all path lighting elements, or by narrowly transmitting only to other lighting elements within a shorter range. In the latter case, the receiving lighting element will forward the location information to the next adjacent lighting element until all lighting elements are advised of the locations of each other lighting element. The processors of each of the lighting elements will then determine the layout of the linear path or path segment by a proximity/adjacency assessment. Suitable accommodations are made for path segments that turn back sharply on one another to the extent that the most proximal lighting element is not the next element along the linear path. Such accommodations are made either in the instructions to installers, or by automatically treating adjoining "loops" as being co-joined but nominally independent path segments.

In an alternative approach, each lighting element is equipped with means to determine, upon receipt of a signal from a proximal lighting element, the range to that other lighting element. In the path-based batch configuration mode, this range is used to determine the next adjacent lighting element along the path using an assumption that the nearest lighting element is adjacent along a linear path.

In another aspect, the invention accommodates junctions between linear path segments that have been separately batch auto-configured. Each lighting element embeds a linear path segment identifier in its transmitted signal. The processor associated with each lighting element calculates whether nominally separate linear path segments appear to intersect or cross. If so, the intersection is assumed to be a junction, in which case the processor enables the lighting element to react to the proximity of a user even though the user is on a nominally separate linear path segment, thereby assuring continuity of the illumination as the user commits to one path segment over another.

The foregoing was intended as a broad summary only of certain aspects of the invention, the full scope of which will be more accurately appreciated by reference to the disclosure and to the claims that follow.

BRIEF DESCRIPTION OF THE DRAWINGS

The preferred and other embodiments of the invention will be described by reference to the drawings thereof, in which:

FIG. 2 is a plan view layout of a plurality of lighting elements according to the preferred embodiment of the invention for illuminating an area;

DETAILED DESCRIPTION OF THE PREFERRED EMBODIMENTS

Figure 1:
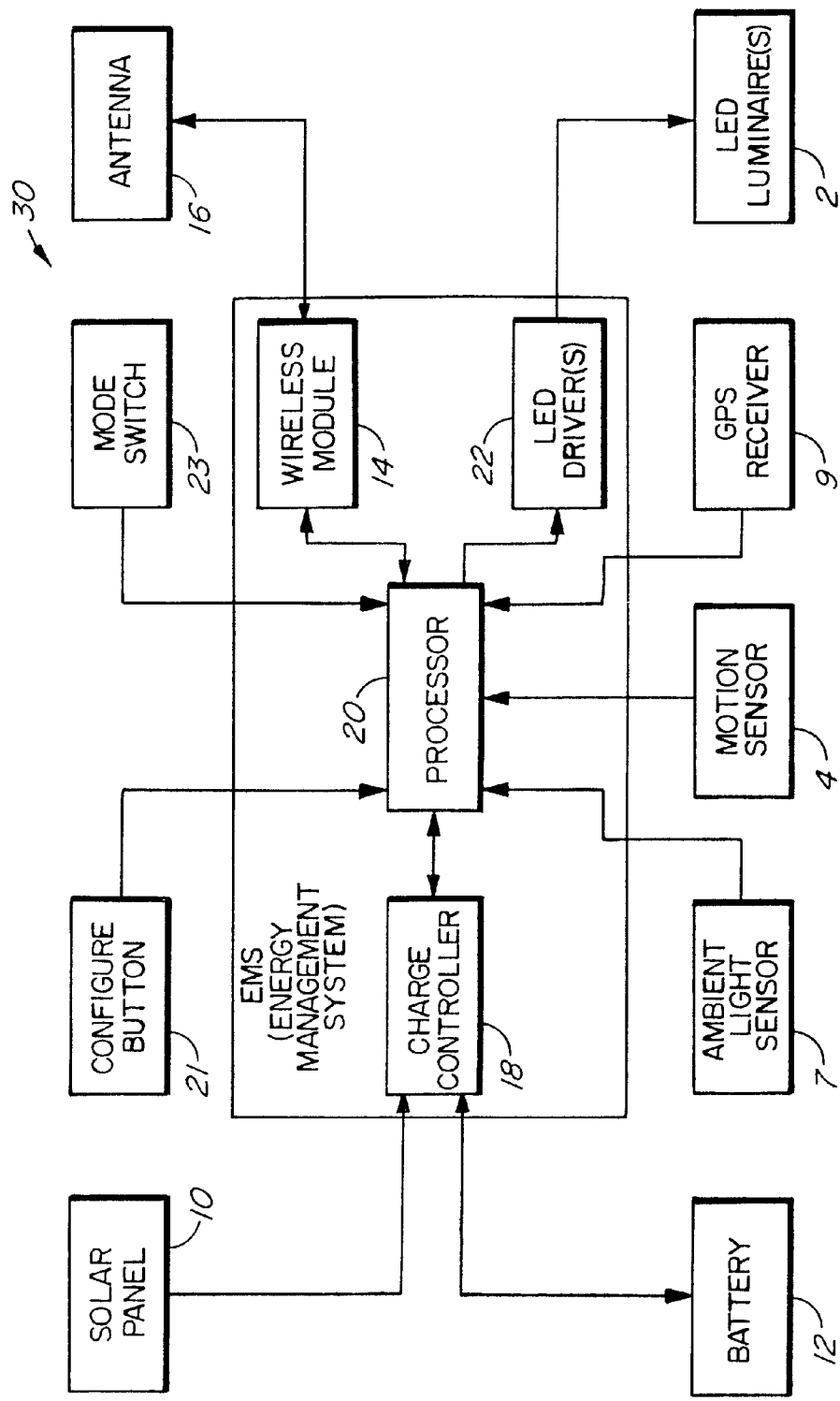
FIG. 1 is a block diagram of a lighting element.

The basic building block according to the preferred embodiment of the invention is a lighting element 30, whose components are illustrated in the block diagram is of FIG. 1. It is to be understood that in use, a plurality of such lighting elements 30 are deployed in an area to be lighted.

Figure 3A:
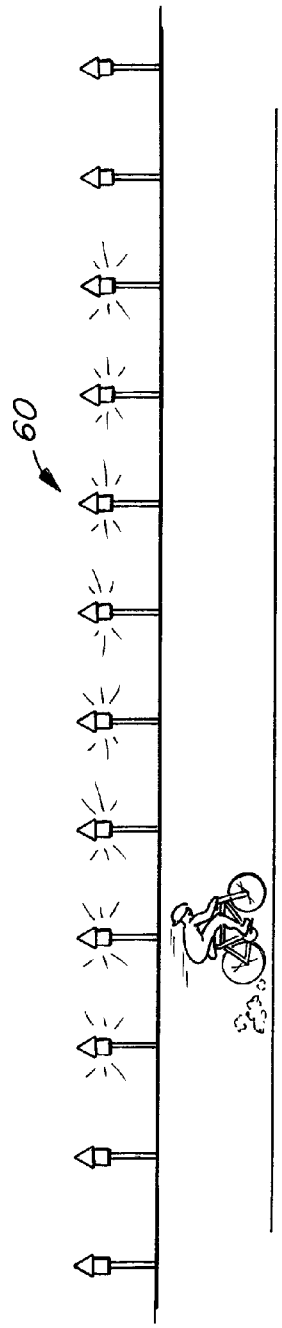
FIGS. 3A and 3B show an embodiment of the invention wherein user speed affects the illumination pattern over the area.
Figure 3B:
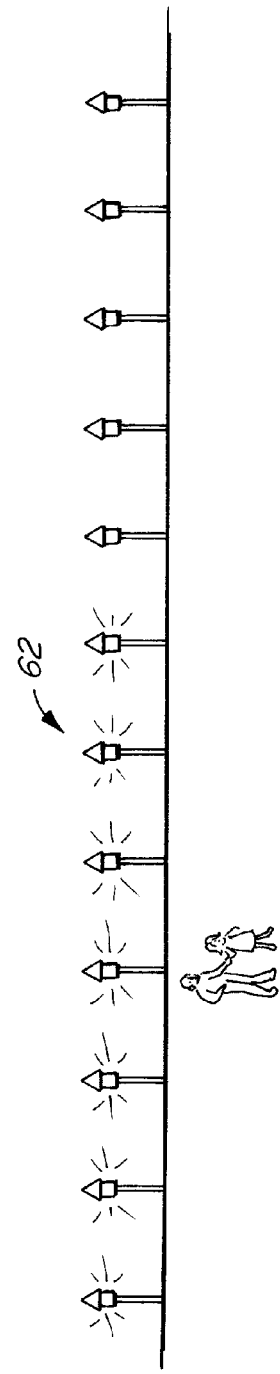

Lighting element 30 comprises a collection of components enabling the functionality of the invention. In the preferred embodiment, the components are mounted on or within a pole (see FIG. 3), although it is within the scope of the invention to provide a ground-based lighting element that is adapted to rest on the ground or to be anchored in place on the ground. Ground-based lighting is often more appropriate and introduces less light pollution into the environment. It will be appreciated that a combination of pole-mounted and ground-based lighting elements 30 may seamlessly be combined in a lighting network as no aspect of the invention depends on the physical housing of the lighting element.

According to the preferred embodiment, the components of the lighting element 30 (mounted in or on the pole) include a light or luminaire 2, a motion sensor 4, an ambient light sensor 7, a GPS receiver 9, a solar panel 10, a battery 12, a wireless communications module 14, an antenna 16, a charge controller 18, a processor 20, a configure button 21, an LED driver 22 and a mode switch 23.

The lighting element 30 may alternatively include more than a single luminaire 2 whose activation is coordinated for simultaneous activation, or according to a predetermined relationship.

The luminaire 2 may be of any type which satisfies the power, performance and aesthetic requirements of a given area to be illuminated. The luminaire 2 may incorporate any suitable light source, such as light-emitting diodes, fibre-optics, fluorescent lights, incandescent lights, phosphorescent lights, gas discharge lamp, electroluminescent surface and so on. The luminaire 2 may also be capable of gradually increasing its intensity at a variable rate from zero to a predetermined amount when instructed to do so. In the embodiment shown, the luminaire 2 is LED-based, and is powered using a constant current drive.

Motion sensor 4 may be provided as a physically distinct unit that is associated with the lighting element 30 by a dedicated communication link. This allows the positioning of the motion sensor in a position that is better suited to sense an approaching user. The dedicated nature of the communication link between the sensor 4 and the lighting element 30 enables automatic configuration of the lighting element 30 and of the broader network of lighting elements 30 without needing to treat the sensors 4 as separate elements to be identified and assigned during the configuration process.

Motion sensor 4 may be based on basic passive infrared technology, which simply detects the presence of a user and sends a signal to the processor. An example of a typical basic sensor is the passive infrared AMN-11112 sensor produced by Aromat™. The motion sensor 4 may also be an ultrasonic sensor, inductive loop sensor or a microwave sensor, as appropriate.

Ambient lighting sensor 7 may comprise any suitable technology, such as a photodiode, photoresistor or at least one photovoltaic cell. Ambient lighting sensor 7 reduces the power demands of the lighting element 30 by restricting the level of light provided by the luminaire 2 when required, such as during the day and at dusk, when there is sufficient ambient light. If desired, the lighting element 30 may be configured to provide a constant stand-by low level of illumination as soon as the ambient light drops to a predetermined level, and then to illuminate more intensely upon detection of a user in the area.

An example of a wireless transceiver module 14 is Model No. AC4790, a 900 MHz transceiver produced by Aero-Comm, Inc. Transceivers using different frequencies, such as 2.4 GHz, may also be used for different applications. Wireless communication systems reduce possible damage due to vandalism or inclement weather, eliminate the need for unsightly wiring between luminaires and/or motion sensors, and reduce installation and maintenance costs and time. Other communications means may include infrared, radio, visible light with pulse code modulation (PCM), visible light with frequency modulation (FM), visible light with amplitude modulation (AM), power-line communication, ultrasound or other suitable means. Antenna 16 may be an integral part of wireless module 14 and LED driver 22 may be considered or housed as part of luminaire 2.

Processor 20 controls a variety of functions for the lighting element 30 including controlling the onset, rate of activation, intensity and persistency of the luminaire 2, coordinating communication functions through wireless module 14, recording the acquisition of location information through GPS receiver 9, detecting signals from an ambient light sensor 7 and from a motion sensor 4, managing the power for the lighting element and its components, processing calculations and implementing protocols for the operation of the luminaire 2 and of communications functions in association with the broader network of similar lighting elements. The processor 20 also monitors the condition of the luminaire 2, to ensure that it has activated upon being instructed to do so, and to keep track of any anomalies in the lighting element.

The lighting element 30 may be powered by any suitable means, including directly from the power grid; through locally generated power, such as an internal combustion generator, fuel cell, or other suitable means; through batteries, which may be recharged by suitable means such as solar power or wind power; or through any combination of power sources. In the embodiment shown, the lighting system 30 is powered by battery 12, which is charged by solar panel 10. Solar panel 10 may be of any appropriate size, depending on the location of the lighting system 30 and the demands made upon it, but typical systems may use 10 W, 20 W or 30 W solar panels. Model CTI-10 solar panels, made by Carmanah Technologies Corp., are examples of appropriate solar panels.

Charge controller 18 monitors and controls the power levels and output of battery 12 and coordinates the charging of battery 12 by solar panel 10. Such power is also supplied to the luminaire 2 and to other components of the system. Processor 20 may use means, such as an algorithm, to monitor relative usage of the luminaire over time, and to make adjustments to the relative brightness of the luminaire depending on the demand. For instance, if the luminaire is being activated more often than usual early in a particular evening, the processor 20 may reduce the relative intensity of the light, in order to conserve power throughout the night.

If the input from the motion sensor 4 allows the processor 20 to determine information about the proximity of the user to the sensor, the processor 20 may also adjust the rate at which the luminaire 2 lights, and the time for which it is illuminated. The processor 20 also controls when to deactivate the luminaire, conserving power while still allowing a user to see the path some distance behind him.

Figure 2:
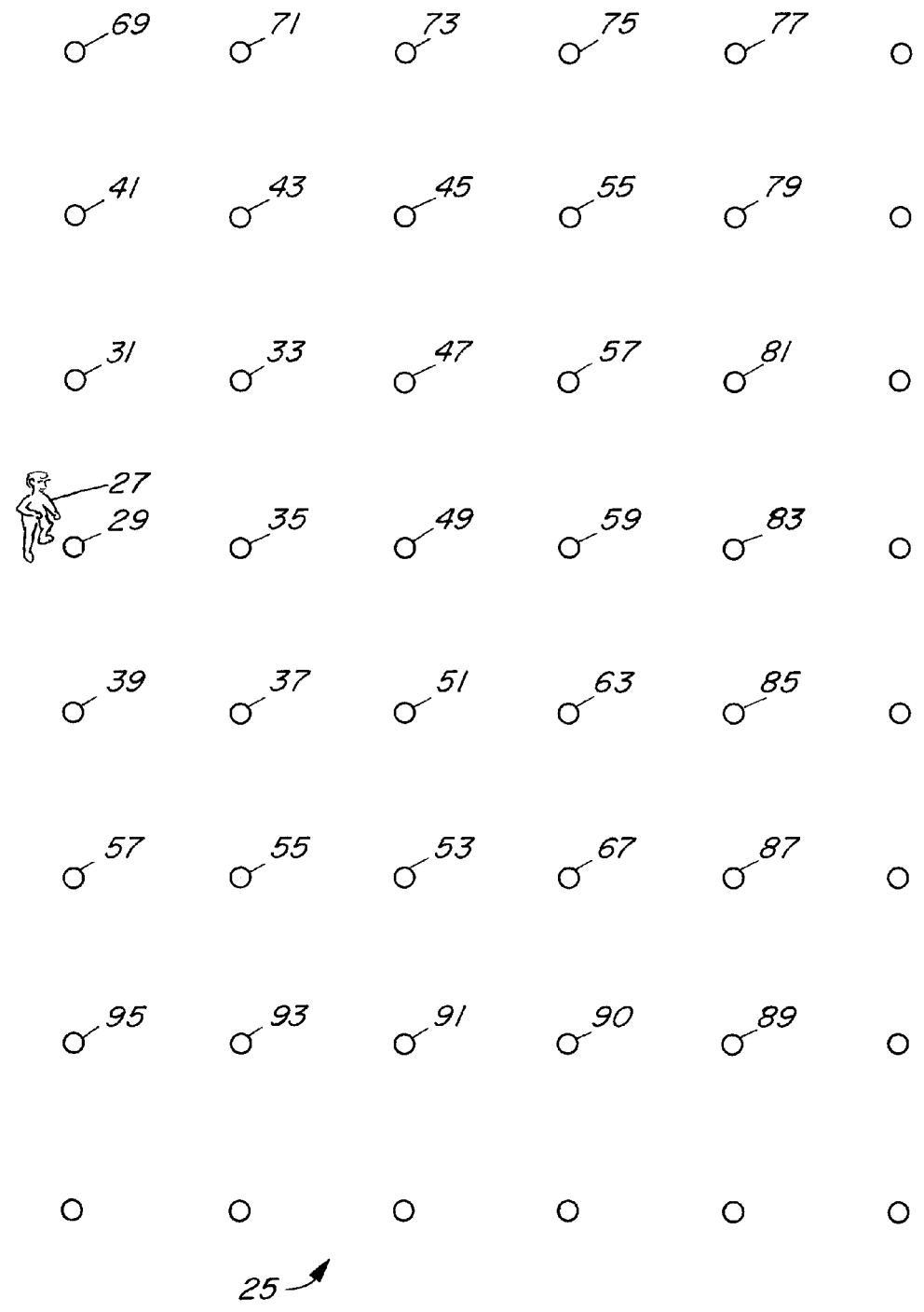

A plurality of lighting elements 30 including integral motion sensors are deployed in an area to be subject to selective illumination according to the presence of a user. In the simplest embodiment illustrated in FIG. 2, lighting elements 30 are deployed in a more or less regular two-dimensional matrix to cover an area of interest, for example a parking lot 25. The installer need not be overly concerned about covering the area with a perfectly regular matrix as the invention is tolerant of an irregular arrangement of lights. However, the installer will most likely seek to provide potential illumination for substantially the whole of the area of interest.

Prior to or upon deployment, each lighting element has been set in one of two modes, namely a radial proximity mode, or a linear path mode, by means of mode switch 23. Such mode may be pre-selected at the factory upon receiving an order for lighting elements, or may be selected in the field by the installer using mode switch 23. In the example under consideration, the lighting elements have been set to the radial proximity mode and such mode may be used as a factory default setting to further facilitate configuration of the lighting elements.

In the radial proximity mode, when a user 27 enters the lot 25, for example at lighting element 29, the motion sensor in lighting element 29 detects the presence of the user. In this example, the processor 20 within the lighting element 29 determines from ambient light sensor 7 that the ambient light is sufficiently low that luminaire 2 should be activated to its maximum intensity rating. A default setting might provide that the activation will take place gradually over a period of, for example, 2 seconds. The processor 20 will simultaneously cause the wireless module 14 to broadcast a signal containing the lighting element 29's GPS coordinates derived from the GPS receiver 9, and indicating that either it has been triggered to illuminate to a brightness indicative of the immediate proximity of a user, or that a user is in lighting element 29's immediate motion sensor range (effectively similar conditions). Each of the other lighting elements within the lot 25 that are within range of the broadcast signal receives the signal. Each of their respective processors 20 decodes the signal and determines the distance of its lighting element to the transmitting element 29.

Based on their own GPS coordinates, each of lighting elements 31, 33, 35, 37 and 39 determines that it is within a predetermined range of, for example, 7 is meters from the transmitting lighting element 29, and as a result their processors 20 also activate their respective luminaires 2 to their maximum intensity. The user 27 is therefore within a fully lighted area of at least 7 meters around the user.

Lighting elements 41, 43, 45, 47, 49, 51, 53, 55 and 57 also decode the signal from lighting element 29 and determine that they are in a predetermined range of between 7 and 15 meters from the lighting element 29. As a result, they activate their respective luminaires to gradually turn on, reaching an intensity of 60% of their maximum intensity over a predetermined period of 5 seconds.

Similarly, more distant lighting elements 59 to 93 determine that they are within a range of 15 to 25 meters from transmitting lighting element 29 and accordingly they activate their luminaires to an intensity of 30% over 5 seconds. The balance of the lighting elements in the lighting network or lot 25 determine that they are over 25 meters from transmitting lighting element 29 and do not activate their respective luminaires.

As user 27 then moves in the direction of lighting element 35, the motion sensor associated with lighting element 35 determines that the user has entered lighting element 35's immediate vicinity. As that lighting element was already at 100% intensity, it remains at that intensity and broadcasts the presence of the user in lighting element 35's zone. Lighting elements 29, 31, 33, 47, 49, 51, 37 and 39 determine that they are within 7 meters and maintain or activate (as the case may be) their luminaires to 100% intensity, with those that were previously at 60%, namely 47, 49 and 51, gradually increasing the intensity over a predetermined period of 5 seconds.

Lighting elements 41, 43, 45, 55, 57, 59, 63, 67, 53, 55 and 57 determine that is they are now within 7 and 15 meters from the user and takes steps to ensure that their respective luminaires maintain or migrate to a 30% intensity. If changing from a previous intensity, the change is accomplished over a predetermined interval of 5 seconds. Similarly, the lighting elements that are now in the 15-25 meters range maintain or migrate their luminaires to an intensity of 30% over 5 seconds, while the lighting elements that are not or are no longer within 25 meters of the user will maintain or migrate to a 0% intensity over a predetermined interval of 5 seconds.

The foregoing radius-based lighting protocol is executed throughout the user's progression through the lighting network. As a result, an area of light gradually and smoothly follows the user in his progression, with luminaires lighting around the user in an intensity that decreases with the distance from the user, and wherein luminaires will extinguish gradually as the user moves out of a particular zone.

Processing software is included in the lighting elements to enable the lighting elements to assess the speed and direction of the user 27 through the lighting network, based on the sequence of GPS coordinates transmitted by the transmitting lighting elements and the timing of transitions between respective detections by adjacent motion sensors/lighting elements. This information is used to further adjust the overall lighting configuration around the user. As a user's direction and speed is ascertained, the lighting elements in the direction of travel respond over a greater distance generally in the direction of travel and over a smaller distance generally in the direction from which the user is travelling.

Thus a user moving from lighting element 29 to element 35 at a higher than nominal speed will cause lighting elements generally forward in the direction of travel to light up to 100% over a shorter interval than 2 seconds, and to do so over a longer distance, for example 11 meters rather than the nominal 7 meters. Similarly, lighting elements in the forward direction of travel will light up to 70% over a shorter interval than 5 seconds and will do so over a distance of 11-25 meters rather than 7-15 meters. More distant lighting elements generally in the forward direction might light up to 30% in less than 5 seconds and over a radius of between 25 and 35 meters. Appropriate programming of the lighting elements results in an effectively elliptical area of illumination extending in the direction of travel around the user, thereby focussing the lighting ahead of the user, and with the amount of lighted distance ahead of the user (i.e. the forward radius or distance) being a function of the speed of the user in that direction. This is also appreciated by reference to FIGS. 3A and 3B in a linear roadway context, which illustrate the elongated, forward-reaching illumination pattern 60 of a rapidly-moving user, and the more symmetric illumination pattern 62 about the position of a slower user. One or more predetermined speed levels can be programmed into the control system to assist in determining how many luminaires should be lit in front of a user for a given speed.

In an alternative embodiment, the motion sensor 4 is also capable of determining the speed and direction of a user thereby obviating the need for the processor 20 to calculate the speed and direction of the user by reference to the time the user takes to travel between motion sensors.

Still referring to the simplest embodiment, each lighting element has also been factory pre-set with a number of default settings, which will now be discussed in turn.

The level of ambient light required to trigger a stand-by illumination level for the luminaire 2 may be preset. The stand-by illumination level may be set at a low is yet visible level, or it may in fact be set for zero light output in the absence of detection of a user.

The correlation between detected ambient light and light output of the luminaire may be preset. In partially lighted areas, such as near lighted facilities, or in a full moon, it may not be necessary to activate the luminaire 2 to its full intensity in order to provide adequate lighting for the user. In such cases, the lighting element may react to the measured ambient light by applying a percentage decrease in the light output it might otherwise be expected to provide. For example, if the ambient light provides 30% of normal daytime lighting and the operating characteristics of the luminaire 2 are such that equivalent normal daytime lighting would require 80% luminaire output, then the lighting element would adjust its light output to 80% of whatever light output the processor would normally require of it, such requirement being itself a function of radius or distance from a transmitting lighting element, or a required stand-by illumination level.

The lighting element 30 are allows for variety of maximum allowed intensities or and a variety of projection modes for the luminaire 2, which may also be factory-preset.

The radii used to determine the intensity, onset and lighting interval for the luminaires, including the persistency before the luminaire begins to decrease its illumination after use, can equally be factory pre-set to default values. The number of differing radii may also be programmed into the lighting elements. The greater the number of radii used, the more gradual may be the gradient between the unlighted areas and the user.

All of such factory pre-settable parameters may also be field programmable. This can be accomplished by means of dip switches, or other user interface means, or by means of a preferably wireless programming interface. However, it will be appreciated that the field programmable approach results in a correspondingly lower degree of auto-configurability for the lighting elements and a greater degree of installer involvement.

Figure 4:
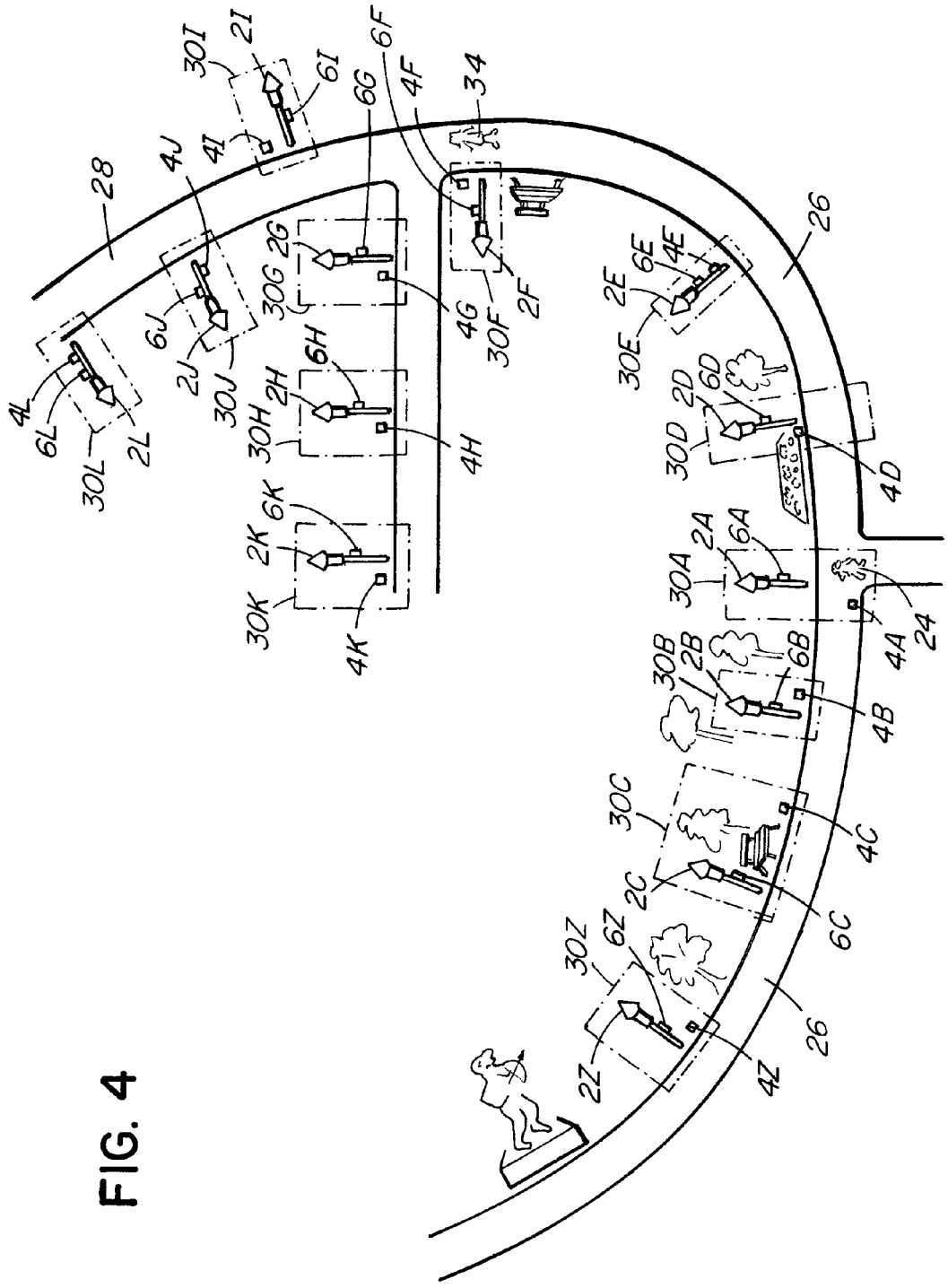
FIG. 4 is a plan view schematic of a lighting network using lighting elements according to the invention.

The radial proximity mode of operation may also be used in a path network context. Referring to FIG. 4, in the absence of a user, all of the lighting elements of the path network operate at a stand-by illumination level. When user 24 enters the path area 26, motion sensor 4A associated with a lighting element 30A (in this case, motion sensor 4A is physically separate from luminaire 2A and processor 6A) will detect the user's presence. Lighting element 30A then broadcasts its detection of the user 24. For the purposes of this illustrative description, we will assume that lighting elements 30B and 30D are between 7 and 15 meters from lighting element 30A and that the processors 20/6X of the system are programmed to illuminate lighting elements to 60% when the user is within 7-15. Accordingly, lighting elements 30B and 30D will gradually bring their respective luminaires to 60% intensity, while lighting elements 30C and 30E, which for these purposes are assumed to be between 15 and 25 meters from lighting element 30A, gradually bring their respective luminaires to 30% intensity (a default intensity for the 15-25 meters range). As the user 24 progresses in one direction or the other along the path, his way will be lighted as he progresses, with the tapering zone of light following him and handshaking its way through the successive lighting elements.

It will be appreciated from the foregoing that a method according to the invention consists of deploying a plurality of lighting means in an area to be lighted, detecting the presence of a user of the area in the vicinity of one of the lighting means, controlling a subset of the plurality of lighting means to illuminate the user wherein some lighting means that are more distant from the user are illuminated at a lower intensity or at a different rate than some lighting means that are closer to the user.

The step of controlling a subset of the plurality of lighting means comprises communicating the presence of the user between lighting means, either directly or through the intermediary of other lighting means.

In another aspect, the method comprises the steps of sensing a user in the area; sending a motion signal to the control system that the user is present; upon receiving said motion signal, instructing a first lighting element to illuminate at a first rate and instructing a second lighting element, either directly or through communication with another control system, to illuminate at a second rate. The second rate may be slower than the first rate, which may be more aesthetically pleasing to the user. The method may also comprise the steps of sensing an ambient light level; sending a light level signal to the control system that the ambient light level is below a predetermined level; and, upon receiving the light level signal, instructing the first lighting element to illuminate to a first level. The system may be configured to prevent lighting elements from illuminating, even upon receiving a motion signal, unless the system has already been signaled that the ambient light level is low. That is, the system can be configured to not provide additional lighting until the area is sufficiently dark. This could assist in conserving energy.

In larger path networks, which can contain several paths, the radial proximity mode described above may result in lights that are nearby but are on separate paths (for example on parallel paths) illuminating unnecessarily. While other solutions are available to overcome or minimize this in the radial proximity mode, the invention's path-wise mode of operation of the lighting elements offers an advantageous means of doing so.

The path-wise mode of operation may be selected by choosing the appropriate setting on mode switch 23 (see FIG. 1). This may be done either in the factory before shipping or in the field by the installer. At least two linear path segments can be defined in the broader path network illustrated in FIG. 4. The path comprising lighting elements 30Z, 30C, 30B, 30A, 30D, 30E, 30F, 30I, 30J and 30L can be defined as a first linear path segment, while the path comprising lighting elements 30G, 30H and 30K can be defined as a second linear path segment.

The lighting elements of each separate linear path segment are configured as a batch. An installer first deploys a first batch of lighting elements along the first linear path segment, pressing the configure button 21 (see FIG. 1) briefly for each lighting element. Once all of the intended lighting elements are in place along the linear path segment, the installer holds configure button 21 down for 10 seconds. This causes the lighting element on which button 21 was held down to transmit a "configure path" signal to all lighting elements within communication range that have not yet been configured. Where necessary, the signal is conveyed to distant lighting elements through adjacent ones. The "configure path" signal includes a unique linear path segment identifier.

Upon receipt of the "configure path" signal, each lighting element acquires its GPS coordinates and recognizes itself (by the unique linear path segment identifier) as part of the first linear path segment. As a user moving along the first linear path segment is detected by a motion sensor, the corresponding lighting element will transmit the event as described above in relation to the radial proximity mode. However, in the case of the path-wise mode, the transmission also includes the linear path segment identifier. As a result, only lighting elements that are part of the same linear path segment will respond to the transmission by implementing the appropriate lighting protocol. It follows that the detection of a user on a closely adjacent, but different, linear path segment will not trigger a lighting response on the adjacent path.

After having configured a first linear path segment, the installer then deploys another batch of lighting elements for the second linear path segment and triggers the "configure path" signal. As in the case of the first linear path segment, the signal causes any unconfigured (i.e., not yet assigned to a linear path segment) lighting elements to recognize themselves as being part of a new linear path segment being configured, bearing a unique identifier for the second linear path segment.

Upon configuring the second linear path segment, if members of the first linear path segment are within communications range of the "configure path" signal, the processors of each lighting element will detect that condition, and will consequently communicate with the other lighting elements to poll the adjacent lighting elements, including those in the other linear path segment, to download to one another the GPS coordinates of each lighting element of each of the first and second linear path segments. This information is used to manage junctions between linear path segments. Each lighting element includes mapping software to map the linear path segments and to extrapolate from the available data where junctions between linear path segments are located. This allows a handshaking between the lighting elements of separate linear path segments so that all lighting elements at a junction may respond to an approaching user by lighting proximate lighting elements about the junction regardless of which linear path segment they have nominally been configured to. Were this not the case, the user's path would only be illuminated in the direction of the linear path segment from which the user has come, even though he might intend to move to the other linear path segment at the junction. By the foregoing strategy, the lighting elements self-configure both for linear path segments and for junctions, implementing a junction illumination protocol, thereby providing an substantially auto-configurable lighting system.

Where a user 34 approaches a junction as in FIG. 4, the lighting element 30F will signal the user's presence by a broadcast signal. As noted above, since lighting element 30F is part of the first linear path segment, the lighting elements 30G, 30H and 30K would not normally respond as they are part of the second linear path segment, not the first linear path segment. However, as each lighting element in proximity of the junction has identified itself as being at a junction, lighting elements 30G and 30I, which were configured as part of separate linear path segments, will nonetheless respond equally to the approaching user (assuming of course that they are at equal distances from lighting element 30F).

Figure 5:
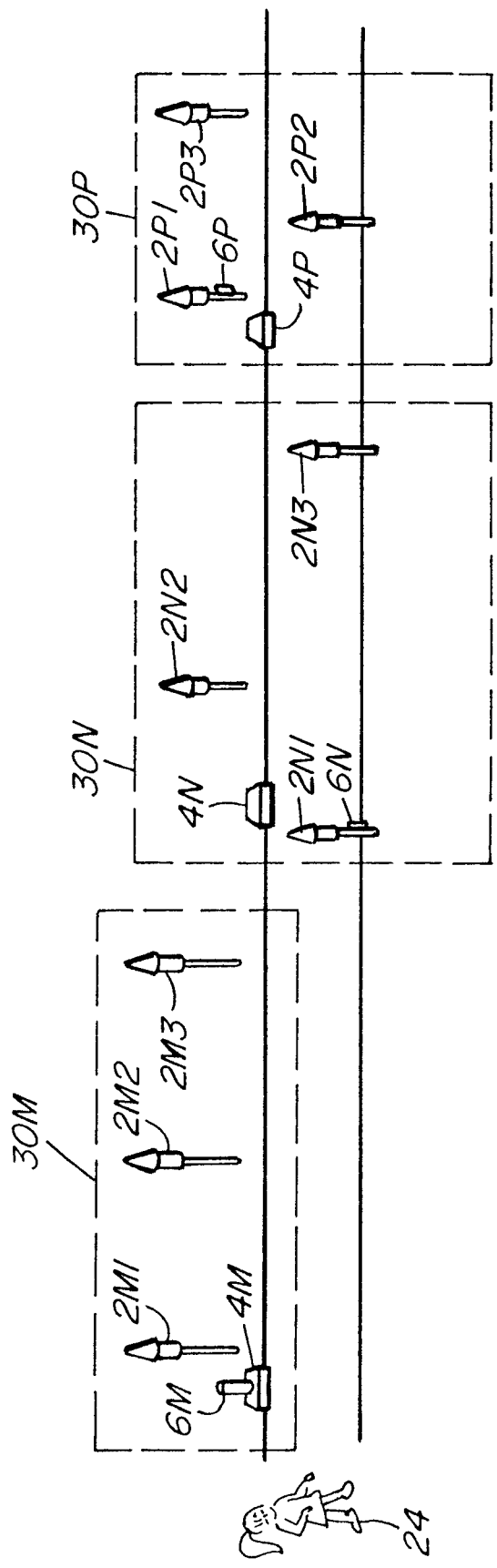
FIG. 5 is a schematic of a network of lighting elements being used to illuminate a path.

While the preferred embodiment of lighting element 30 has been described as including a single luminaire 2, a control system 6 may be used to control a number of separate luminaires 2, as shown in FIG. 5. The system 30M will operate in a similar manner, with its control system 6M controlling the relative timing and illumination rates of several luminaires 2M1, 2M2, 2M3, as well as communicating with neighboring systems 30N, 30P (each shown surrounded by dotted lines for clarity) and performing control and operations functions usually performed by a processor 20 associated with an individual lighting system. In an embodiment comprising several luminaires 2, the control system 6 uses additional input relating to the speed of the user 24, for example from motion sensors 4N and 4P, to determine the number of luminaires 2N1-2P3 which should be illuminated around the user 24 in order to provide a sense of security. Further, when a last luminaire in a first path lighting system activates (e.g. luminaire 2M3), the closest luminaire in the next system (luminaire 2N1) may then activate as well.

An alternative approach to configuring the lighting elements for a path network includes a central control, server or monitoring system, through which the coordinate information for the various lighting elements are plotted on a map. The installer uses an appropriate user interface to graphically plot the paths and junctions. While effective, this solution involves a greater degree of installer input than the auto-configuration system described above.

Figure 6:
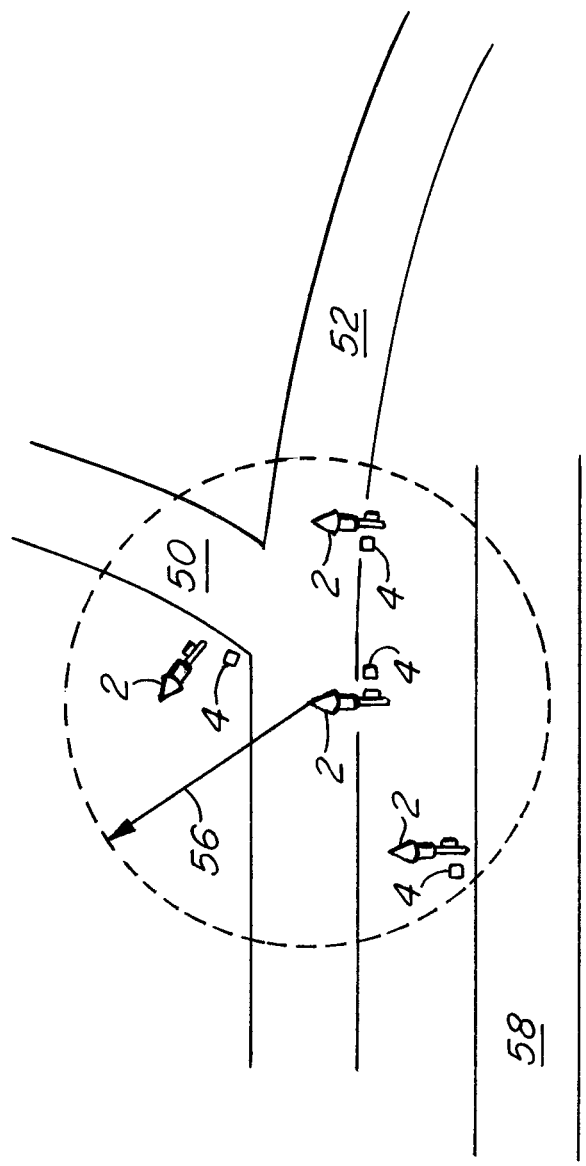
FIG. 6 is a schematic of a portion of a network of lighting elements in the vicinity of a path junction; and, FIG. 7 is a plan view schematic of a parking lot according to an embodiment of the invention.

It is also contemplated that each lighting element 30 may use a light sensor to read messages embedded in the visible light output from neighboring luminaires 2. When a user 34 is detected, it will cause its own luminaire(s) 2 to illuminate, and will send a message to neighboring lighting elements embedded in the visible light emitted. The lighting elements receiving this transmission will relay the message to successive lighting elements with the addition of a counter. Each lighting element may have a configurable counter limit. Each time the message is relayed, the counter may be incremented. The lighting elements preferably will not relay a message that has a counter equal to or greater than the limit, in order to limit how far the illumination propagates. This system of relaying information allows the communication between lighting elements to reach over a much longer range and in different directions, than might be possible through direct communication. A similar handshake system of communication may advantageously be used for radio communication between lighting elements, particularly having regard to regulatory limits on radio transmissions Another way in which the lighting system 30 may be configured to react at junctions will be described by reference to FIG. 6. One is to have the motion detector 4 for each path 50, 52 positioned quite close to the junction 54, allowing the lighting elements on the selected path to respond relatively quickly as a user commits to that path, while the other path remains dark. Alternatively, the lighting element immediately preceding the junction 54 may be configured to send out a message to all lighting elements within a given radius 56. Both paths 50, 52 are then illuminated for the user, allowing him to see all paths before choosing one. The lighting elements in this radius-based method would preferably be positioned at such a distance that only the first luminaires 2 on each of the paths out of the junction are illuminated, otherwise other lighting elements (path 58) would illuminate unnecessarily if the lighting element has been deployed in a relatively close-packed network of paths. Another option is to program the lighting element immediately preceding the junction to communicate specifically with the lighting elements on paths 50, 52, while ignoring the lighting element on path 58.

In other cases, the significant factor in choosing the system is the need only for intermittent lighting in order to avoid wasting energy when the illumination is not required for a user. For example, installing the system on a relatively unused highway or other roadway would minimize the power demands while still keeping the road safe when a driver does use the road. The communication between the control systems is important in this application, in order to judge how quickly a vehicle is traveling along the road. As in the embodiment shown in FIGS. 3A and 3B, a faster moving vehicle should have more illumination before it, in order to identify potential obstacles as early as possible. This speed detection capability may also be useful as a warning signal. If a driver is approaching a curve or an obstruction at too high a speed, a warning light may illuminate or flash. The communication between the control systems can also help to identify potential hazards, such as wildlife ingress onto the road. If a motion sensor on the highway detects a sudden movement without having been forewarned by a neighboring sensor, it assumes that the detected movement is from an unexpected intruder, and illuminates its luminaire in a different, warning, pattern, such as by rapid flashing, in order to signal a potential hazard.

Figure 7:
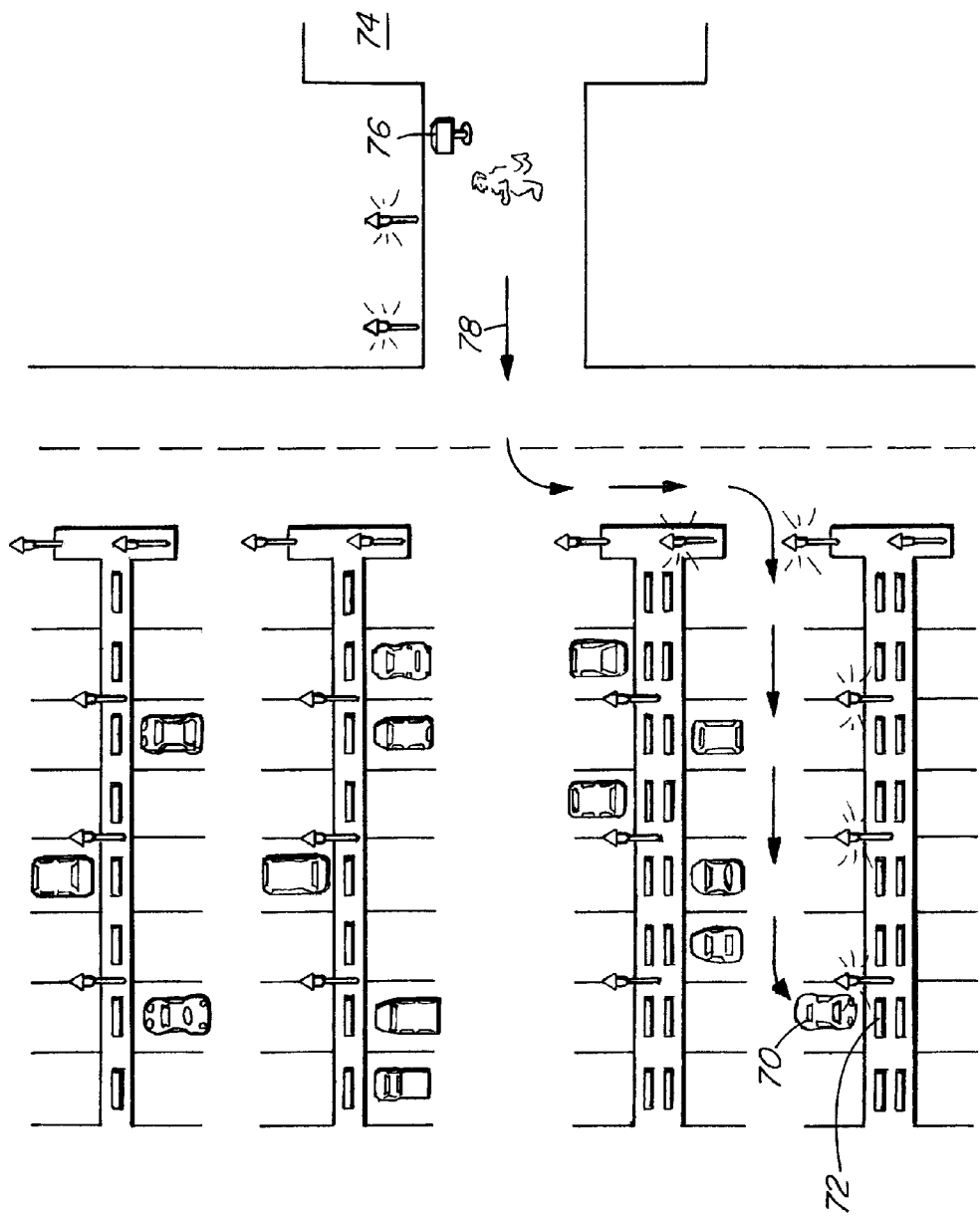

Another application for the system is as a guidance means, to guide users to requested destinations. One possible application for a guidance lighting system is in a parking lot, as shown in FIG. 7. A user may park his vehicle 70, and identify himself at a terminal 72, before proceeding to the exit 74. As the user finds his way from his vehicle to an exit of the parking lot, the lighting system of the invention gradually lights his way based on sensing the user's movement as described above. A memory means records the path taken between the terminal and the exit. When the user returns to the parking lot, he again identifies himself at a terminal 76. The system then calculates a path to the vehicle (which may be the same path taken by the user to leave the lot, but in reverse) and gradually lights the way for the user, who is then guided to easily and safely locate the vehicle. Identifying means 72 and 76 may be any secure means, such as a credit card reader or a fingerprint scanner. Alternatively, each stall may be mapped in a database associated with the parking lot lighting system. By identifying the appropriate stall, such as by the bar code on a stall receipt, the lighting system calculates a return path to the vehicle to guide the user through the lot. This has the advantage of not only providing illumination, but also of assisting the user in locating the stall.

The various embodiments and features of the invention have been described herein. It will be appreciated that variations may be practised without departing from the scope of what has been invented, such scope being defined by the disclosure and claims as amended from time to time.

The invention claimed is:

1. A lighting element for use in a lighting system, comprising:
   a light source;
   a processor;
   a detector for determining the coordinates of the lighting element;
   a transceiver; and
   said processor being programmable to selectively cause said light source to illuminate according to the distance of said lighting element from an other lighting element upon receipt of a transmission from said other lighting element.

2. The lighting element of claim 1 wherein said transmission signals an event selected from among the group comprising: the activation of said other lighting element and the detection of motion associated with said other lighting element.

3. The lighting element of claim 2 further comprising a battery, a solar panel for charging said battery, a motion sensor and wherein said processor is programmed to transmit a detection signal and coordinates of said lighting element upon receiving a signal from said motion sensor that motion has been detected and is programmed to implement a lighting protocol upon receiving a transmission from an other lighting element signaling that an other lighting element has detected motion in the vicinity of said other lighting element.

4. The lighting element of claim 3 wherein said lighting protocol is a function of the distance between said lighting element and said other lighting element.

5. The lighting element of claim 4 wherein said lighting protocol determines a lighting parameter for said light source selected from among the group comprising: intensity and rate of illumination.

6. The lighting element of claim 1 further comprising a power source for said lighting element.

7. The lighting element of claim 6 wherein said power source comprises a solar panel and a battery.

8. The lighting element of claim 1 wherein said lighting element is associated with a motion sensor.

9. The lighting element of claim 8 wherein said motion sensor is integral with said lighting element.

10. The lighting element of claim 8 wherein said processor is programmed to transmit a detection signal and coordinates of said lighting element upon receiving a signal from said motion sensor that motion has been detected.

11. The lighting element of claim 1 further comprising an ambient light sensor.

12. The lighting element of claim 1 wherein said detector is a GPS coordinate detector.

13. The lighting element of claim 1 wherein said lighting element is adapted to be operated in a radial proximity mode or configured in a path network lighting mode.

14. The lighting element of claim 1 wherein said processor is programmed to acquire a unique path segment identifier upon being field configured and to transmit said unique path segment identifier when signaling detection of motion associated with said lighting element.

15. The lighting element of claim 14 wherein said processor is programmed to map a path network and to selectively assign to said lighting element a junction illumination protocol.

16. The lighting element of claim 1 wherein said processor is further programmable to selectively cause said light source to illuminate according to the speed of movement detected by said other lighting element.

17. A method of illuminating an area comprising:
   deploying a plurality of lighting means in said area, each having associated coordinates;
   detecting the presence of a user of the area in the vicinity of a first of said lighting means; and
   one or more others of said plurality of lighting means each responding to said detecting by determining a distance between its coordinates and the coordinates of said first lighting means, and illuminating according to a lighting protocol based on said distance.

18. The method of claim 17 wherein-said lighting protocol includes a determination of an intensity at which said others are to illuminate.

19. The method of claim 17 wherein said lighting protocol includes a determination of a rate at which said others are to illuminate.

20. The method of claim 17 further comprising the step of communicating between lighting means the presence of said user.

21. The method of claim 20 wherein said step of communicating is through the intermediary of intermediate lighting means.

22. The method of claim 17 further comprising the step of causing said first lighting means to illuminate at a first rate and instructing a second lighting means to illuminate at a second rate.

23. The method of claim 22 wherein said second rate is slower than said first rate.

24. The method of claim 17 further comprising the steps of sensing an ambient light level; sending a light level signal to a processor, said processor determining that the ambient light level is below a predetermined level; and, upon receiving the light level signal, instructing a lighting means to illuminate to a first level.

25. The method of claim 17 wherein said lighting protocol is further determined according to said distance and a speed of said user.

26. The method of claim 17 wherein said lighting protocol includes a determination of whether to illuminate said others, a rate at which to illuminate said others, and an intensity to which said others are to be illuminated.

27. A lighting element for use in a lighting system, comprising:
- a light source;
- a processor;
- a detector for determining the coordinates of the lighting element;
- a transceiver; and
- said processor being programmable, upon receipt of a transmission from an other lighting element, to determine and implement a lighting protocol for said light source based on the distance between said coordinates and the coordinates of said other lighting element;
- said lighting protocol including activation parameters selected from the group comprising: whether to illuminate said light source, a rate at which to illuminate said light source, and an intensity to which said light source is to be illuminated.

28. The lighting element of claim 27 wherein said transmission signals an event selected from among the group comprising: the activation of said other lighting element and the detection of motion associated with said other lighting element.

29. The lighting element of claim 28 further comprising a battery, a solar panel for charging said battery, and a motion sensor, and wherein said lighting protocol includes transmitting a detection signal and said coordinates upon receiving a signal from said motion sensor that motion has been detected.

30. The lighting element of claim 27 further comprising a solar panel and a battery.

31. The lighting element of claim 27 wherein said lighting element is associated with a motion sensor.

32. The lighting element of claim 31 wherein said processor is programmed to transmit a detection signal and coordinates of said lighting element upon receiving a signal from said motion sensor that motion has been detected.

33. The lighting element of claim 27 further comprising an ambient light sensor.

34. The lighting element of claim 27 wherein said lighting element is adapted to be operated in a radial proximity mode or configured in a path network lighting mode.

35. The lighting element of claim 27 wherein said processor is programmed to acquire a unique path segment identifier upon being field configured and to transmit said unique path segment identifier when signaling detection of motion associated with said lighting element.

36. The lighting element of claim 35 wherein said processor is programmed to map a path network and to selectively assign to said lighting element a junction illumination protocol.

37. The lighting element of claim 27 wherein said lighting protocol is selected according to user movement detected by said other lighting element.

* * * * *